US008901517B2

(12) United States Patent
Iftime et al.

(10) Patent No.: US 8,901,517 B2
(45) Date of Patent: Dec. 2, 2014

(54) FLUORESCENT SECURITY PHASE CHANGE INK

(75) Inventors: Gabriel Iftime, Mississauga (CA); Maria Birau, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 147 days.

(21) Appl. No.: 13/537,671

(22) Filed: Jun. 29, 2012

(65) Prior Publication Data

US 2014/0001377 A1 Jan. 2, 2014

(51) Int. Cl.
G01N 21/64 (2006.01)

(52) U.S. Cl.
USPC ..................................................... 250/461.1

(58) Field of Classification Search
CPC ...................................................... G01N 21/64
USPC ..................................................... 250/461.1
See application file for complete search history.

(56) References Cited

U.S. PATENT DOCUMENTS

| 5,122,187 | A | 6/1992 | Marchessault |
| 5,782,966 | A | 7/1998 | Bui |
| 6,309,453 | B1 | 10/2001 | Banning |
| 6,858,070 | B1 | 2/2005 | Wong |
| 6,860,930 | B2 | 3/2005 | Wu |
| 6,906,118 | B2 | 6/2005 | Goodbrand |
| 7,549,592 | B2 | 6/2009 | Iftime |
| 7,674,326 | B2 | 3/2010 | Iftime |
| 2008/0087190 | A1* | 4/2008 | Iftime et al. ............... 106/31.15 |
| 2008/0121815 | A1* | 5/2008 | Agrawal et al. ............ 250/473.1 |
| 2010/0083869 | A1 | 4/2010 | Birau |
| 2010/0084610 | A1 | 4/2010 | Iftime |
| 2010/0230615 | A1* | 9/2010 | MacPherson et al. ...... 250/488.1 |

* cited by examiner

*Primary Examiner* — David Porta
*Assistant Examiner* — Hugh H Maupin
(74) *Attorney, Agent, or Firm* — Pillsbury Winthrop Shaw Pittman LLP

(57) ABSTRACT

Disclosed is a fluorescent ink containing more than one fluorescent materials that upon exposure to different excitation wavelengths emits different color. Also disclosed is a process of authentication using said fluorescent ink.

19 Claims, 5 Drawing Sheets

FLUORESCENT SECURITY PHASE CHANGE INK

BACKGROUND

The present embodiments relate to fluorescent compositions such as solid phase change or hot melt inks, and more particularly to a security ink including two fluorescent materials therein which may be activated under different excitation wavelengths to authenticate security documents.

There are many applications in which it is desirable to incorporate a security feature into a document or article. Such security features provide ways to authenticate or validate the article and thus prevent counterfeiting. Security printing capability has been recently enabled for phase change inks. Inks containing a special fluorescent security materials were demonstrated to emit bright colored light when viewed under UV light. The appearance and disappearance of the printed ink upon exposure to radiation feature enables authentication of printed materials (See U.S. Pat. No. 7,674,326 issued on Mar. 9, 2010). Furthermore, the use of encrypted information with fluorescent materials has been demonstrated in (See U.S. Pat. No. 7,549,592 issued on Jun. 23, 2009)

Fluorescent phase change inks enable authentication of documents has been known in the art. Such fluorescent phase change inks are prepared by including a fluorescent dye or a mixture of fluorescent dyes to achieve a desired emitted color under UV light excitation. Prints made with such security inks are typically authenticated with a black light source (UVA). For example, modern currency bills contain a security strip imbedded into them that glows bright green under a black light. A duplicated print can be detected if the counterfeiter finds a fluorescent material emitting the color of the original document when exposed to UV light. However, the short side of this technology is that the final emitted color stays the same (i.e., emits only one given color at different wavelength excitations), which makes such prints vulnerable to counterfeiting as the counterfeiter only needs to match one emitted color.

Thus, there is a need to enhance the security of printed documents. There is a need to provide a cost effective security ink and detection method which is more difficult to counterfeit when compared with the current technology. It is also more beneficial if the ink has properties which a counterfeiter does not expect.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising In particular, the present embodiments provide a fluorescent ink comprising more than one fluorescent materials capable of emitting different colors of light upon exposure to different excitation wavelengths.

In further embodiments, there is provided a fluorescent ink comprising a first fluorescent material and a second fluorescent material, wherein the difference between the absorption maxima of the first fluorescent material and the absorption maxima of the second fluorescent material is at least 30 nm, wherein the fluorescent ink emits light of a first color upon exposure to a first excitation wavelength and emits a light of a second color upon exposure to a second excitation wavelength, wherein the difference between the first excitation wavelength and the second excitation wavelength is at least 30 nm.

In yet other embodiments, there is provided a method of authentication comprising providing a substrate; contacting the substrate with a fluorescent ink comprising more than one fluorescent materials that emits different colors of light upon exposure to different excitation wavelengths; and detecting emissions under different excitation wavelengths.

BRIEF DESCRIPTION OF THE DRAWINGS

The patent or application file contains at least one drawing executed in color. Copies of this patent with color drawings will be provided by the Patent and Trademark Office upon request and payment of necessary fee.

For a better understanding of the present embodiments, reference may be had to the accompanying figures.

DETAILED DESCRIPTION

Figure 1:
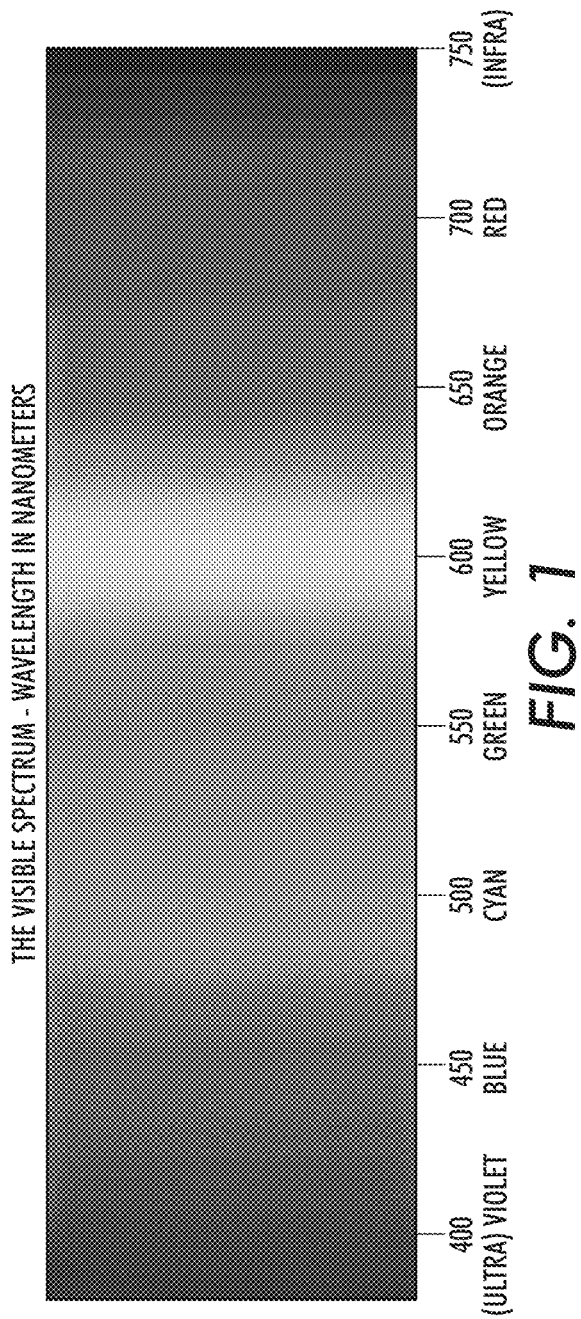
FIG. 1 illustrates a visible spectrum.

In the following description, it is understood that other embodiments may be utilized and structural and operational changes may be made without departure from the scope of the present embodiments disclosed herein.

The term "fluorescent materials" is used interchangeably with the terms "fluorescent additives," and "fluorescent dyes."

Disclosed herein are security phase change inks comprising more than one fluorescent materials that emit different colors when viewed under different UV excitations. In embodiments, the disclosure provides fluorescent ink compositions comprising two or more fluorescent materials. In embodiments, the disclosure provides fluorescent ink compositions (or fluorescent dual color ink compositions) comprising two fluorescent materials. In embodiments, the disclosure provides fluorescent ink compositions (or fluorescent multiple color ink compositions) comprising three or more fluorescent materials. Each of the fluorescent materials present in the security phase change inks has a different light absorption and emission properties when exposed to different exciting UV light wavelengths. For example, the fluorescent ink may contain a first fluorescent material, a second fluorescent material, a third fluorescent material, and so forth, where the fluorescent ink emits light of a first color upon exposure to a first excitation wavelength, emits light of a second color upon exposure to a second excitation wavelength, emits light of a third color upon exposure to a second excitation wavelength, and so forth.

It is important to note that simply mixing two or more fluorescent materials that each emit a different color used separately is not sufficient to provide a dual or multiple color emitting fluorescent ink. Such random mixing of fluorescent materials most likely provides inks which emit a color which is the sum of the individual colors.

The present disclosure provides fluorescent inks when exposed to different excitation wavelengths emit more than one color. In order to enable an user to visually distinguish between the emitted colors under the excitation UV lights, the fluorescent materials are carefully selected to meet the criteria in which (a) there is a sufficient difference in the absorption maxima of the fluorescent materials, and (b) there is a sufficient difference in the excitation wavelengths of the emitted colors.

In embodiments, each of the fluorescent materials has a strong absorption (high extinction coefficient) at a wavelength excitation that is different than the other fluorescent materials. The difference between the absorption maxima between any two fluorescent materials should be at least 30 nm, 50 nm or 100 nm. In practice, the larger the difference between the absorptions of the two fluorescent materials, the easier the activation of each fluorescent colors. In particular embodiments, when a fluorescent ink includes two or more fluorescent materials, e.g., two fluorescent materials, the difference between the absorption maxima of the first fluorescent material and the absorption maxima of the second fluorescent material is at least 30 nm. In further embodiments, when a fluorescent ink includes three or more, e.g., three fluorescent materials, the difference between the absorption maxima of the first fluorescent material and the absorption maxima of the second fluorescent material is at least 30 nm, and the difference between the first excitation wavelength and the third excitation wavelength is at least 30 nm and the difference between the first excitation wavelength and the third excitation wavelength is at least 30 nm.

The absorption maxima of one of the fluorescent materials (e.g., a first, a second, a third or any additional fluorescent material present in the ink) may be from about 180 nm to about 300 nm, such as from about 220 nm to about 280 nm, or about 254 nm (UVC). The absorption maxima of the other one of the fluorescent materials (e.g., a first, a second, a third or any additional fluorescent material present in the ink) may be from about 320 nm to about 400 nm, such as from about 340 nm to about 380 nm, or about 365 nm (UVA). The absorption maxima of the other one of the fluorescent materials (e.g., a first, a second, a third or any additional fluorescent material present in the ink) may be from about 280 nm to about 360 nm, such as from about 280 nm to about 315 nm (UVB). In a specific embodiment, the absorption maxima of a first fluorescent material may be about 254 nm (UVC) and the absorption maxima of a second fluorescent material may be about 365 nm (UVA). In another specific embodiment, the absorption maxima of a first fluorescent material may be about 254 nm (UVC) and the absorption maxima of a second fluorescent material may be about 315 nm (UVB). In further another specific embodiment, the absorption maxima of a first fluorescent material may be about 254 nm (UVC) and the absorption maxima of a second fluorescent material may be about 365 nm (UVA).

FIG. 1 shows an emission spectrum of visible light (400 nm-750 nm) as reference. A difference of at least 30 nm, 50 nm, or 100 nm between any of the two emitted wavelengths is sufficient separation to enable unambiguous detection. In practice, the larger the difference the easier the detection of different emitted.

The wavelength of any one of the emitted colors (e.g., a first, a second, a third, or any additional emitted color) may be from about 400 nm to about 750 nm. In a specific embodiment, the wavelength of a first emitted color may be from about 500 nm to about 600 nm, or about 550 nm (green color), and the wavelength of a second emitted color may be from about 600 nm to about 650 nm, or about 620 nm (orange). Such colors can easily be differentiated by a human eye.

In embodiments, the fluorescent ink emits light of a first color upon exposure to a first excitation wavelength, emits a light of a second color upon exposure to a second excitation wavelength, and so forth.

In embodiments, when a fluorescent ink includes two or more fluorescent materials, e.g., two fluorescent materials, the difference between the first excitation wavelength and the second excitation wavelength is at least 30 nm. In further embodiments, when a fluorescent ink includes three or more fluorescent materials, e.g., three fluorescent materials, the fluorescent ink further emits light of a third color upon exposure to a third excitation wavelength, the difference between the first excitation wavelength and the third excitation wavelength is at least 30 nm and the difference between the first excitation wavelength and the third excitation wavelength is at least 30 nm.

The observed color of the fluorescent inks under different UV excitation (detection) wavelengths depend upon the absorption maxima of the selected fluorescent materials. Considering a dual color fluorescent ink comprising two fluorescent materials being viewed under two different excitation wavelengths at 254 nm (UVC) and 365 nm (UVA), several scenarios/observations are illustrated below in Table 1. For example, (Scenario 1): Ink #A contains a fluorescent material (X) that has a strong absorption at UVC and emits Color 1 (green), and another fluorescent material (Y) that has a strong absorption at UVA and emits Color 2 (red). The observed color under UVC is green and the observed color under UVA is red. (Scenario 2): Ink #B was reduced to practice, which contains a fluorescent material (X) that emits Color 1, which has a strong absorption at UVC and a weak absorption at UVA. Ink #B also contains another fluorescent material (Y) that emits Color 2, which has a weak absorption at UVC and a strong absorption at UVA. The observed color under UVC was mostly Color 1 and the observed color under UVA was mostly Color 2. (Scenario 3): Ink #C contains a fluorescent material (X) that emits Color 1, which has a strong absorption at both UVC and UVA. Ink #C also contains another fluorescent material (Y) that emits Color 2, which has a strong absorption at UVC and a weak absorption at UVA. The observed color under UVC is a combination of Color 1 and Color 2, and the observed color under UVA is mostly Color 1. (Scenario 4): Ink #D contains a fluorescent material (X) that emits Color 1, which has a weak absorption at UVC and a strong absorption at UVA. Ink #D also contains another fluorescent material (Y) that emits Color 2, which has a strong absorption at UVC and a weak absorption at UVA. The observed color under UVC is mostly Color 2, and the observed color under UVA is mostly Color 1.

TABLE 1

Embodiments providing dual color emitting fluorescent phase change inks.

| Ink # | Fluorescent X excitation wavelength | Fluorescent X emission wavelength | Fluorescent Y excitation wavelength | Fluorescent Y emission wavelength | Observed color |
|---|---|---|---|---|---|
| A | UVC UVA | Color 1 (e.g., Green) None | UVC UVA | None Color 2 (e.g., Red) | Under UVC: green Under UVA: red |
| B | UVC UVA | Strong Color 1 (e.g., green) Low Color 1 (e.g., green) | UVC UVA | Low Color 2 (e.g., red) Strong Color 2 (e.g., red) | Under UVC: Color 1 (mostly): e.g., green Under UVA: Color 2 (mostly): e.g., red |
| C | UVC UVA | Strong Color 1 Strong Color 1 | UVC UVA | Strong Color 2 Low Color 2 | Under UVC: Color 1 + 2 Under UVA: Color 1 |
| D | UVC UVA | Low Color 1 Strong Color 1 | UVC UVA | Strong Color 2 Low Color 2 | Under UVC: Color 2 (mostly) Under UVA: Color 1 (mostly) |

Suitable fluorescent materials include fluorescent dyes. Examples of fluorescent dyes suitable for use herein include those belonging to the dye families known as rhodamines, fluoresciens, coumarins, napthalimides, benzoxanthenes, acridines, azos, coordination complexes of rare earth metal ions, mixtures thereof and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightner 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment & Color Co. form Akron, Ohio. Non-limiting examples of fluorescent materials include 2-(2-hydroxybenzoxazol), 2,5-diphenyl-oxazole, DFKY-C7 (red emitting fluorescent rare earth metal coordination complex dye), DFSB K427 (emits orange color under ambient light and under exposure to UV light), 2-(2-hydroxyphenylbenzothoazole), and mixtures thereof.

Each one of the fluorescent materials (i.e., each of first, second, third, or any additional fluorescent material) may comprise the same or different fluorescent dyes from the other fluorescent materials present in the fluorescent ink.

The fluorescent materials used herein generally do not include fluorescent pigments Typically, such composite particles are made of fluorescent pigments dispersed in extremely hard and robust polymer matrix, and are typically of 1-5 microns in size. Such large sized particles are not suitable for inkjet printing as they may plug the print-head nozzles. However, fluorescent nanopigments of a size smaller than about 500 nm, are suitable because they are jettable through an inkjet print-head nozzles without risk of plugging.

The fluorescent organic nanoparticles may be of a maximum size of less than about 500 nm, such as less than about 200 nm, or less than about 100 nm as measured with a Nicomp Particle analyzer. In particular embodiments, the fluorescent organic nanoparticles are robust, hard particles and are dispersible in organic solvents.

Suitable examples of fluorescent nanoparticles (i.e. nanopigments) of a size smaller than 500 nm include are composed of a fluorescent compound, such as a benzothioxanthene pigment, including at least one functional moiety, and a stabilizer compound including at least one functional group, wherein the functional moiety associates non-covalently with the functional group; and the presence of the associated stabilizer limits the extent of particle growth and aggregation, to afford nanoscale-sized particles. Such fluorescent nanoparticles are disclosed in US Patent Application 20100083869, entitled "FLUORESCENT NANOSCALE PARTICLES" Birau et al., filed Oct. 6, 2008.

Another class of suitable fluorescent nanopigments are made by preparing a polymer latex by using an emulsion aggregation process. As used herein "fluorescent organic nanoparticle" describe a polymer matrix comprising one or more polymer resins, including one or more crosslinked resins, and one or more fluorescent dyes dispersed inside the resin matrix. Such fluorescent nanoparticles are disclosed in US Patent Application 20100084610 entitled "FLUORESCENT ORGANIC NANOPARTICLES AND A PROCESS FOR PRODUCING FLUORESCENT ORGANIC NANOPARTICLES" to Mime et al., filed on Oct. 6, 2008.

The total amount of fluorescent materials may be present in a fluorescent ink from about 0.01% to about 15%, from about 0.1% to about 10%, or from about 0.2% to about 5% by weight of the fluorescent ink. Each fluorescent material may be independently present from about 0.005% to about 14.99%, from about 0.05% to about 9.90%, or from about 0.10% to about 4.8% by weight of the fluorescent ink. It is also worthwhile to note that the fluorescent material is capable of exhibiting fluorescence in very small amounts.

In certain embodiments, the fluorescent ink may include a colored non-fluorescent material. Such fluorescent ink emits a color when viewed in ambient light, and emits different colors under excitation with different UV wavelengths. When exposed to UV excitations, the fluorescent ink may emit color which may be the same or different from the color displayed in ambient light. A change in the appearance of the fluorescent ink is visible due to fluorescence of the fluorescent material upon exposure to the UV excitation.

Examples of suitable colored non-fluorescent material include pigments, dyes, mixtures of pigments and dyes, mixtures of pigments, mixtures of dyes, and the like. Any dye or pigment may be chosen, provided that it is capable of being dispersed or dissolved in the ink vehicle and is compatible with the other ink components. Examples of colored non-fluorescent material include cyan, magenta, yellow, black or mixtures thereof.

Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P—F7RK; Hostaperm Violet BL (Clariant); LITHOL Scarlet 4440 (BASF); Bon Red C (Dominion Color Company); ORACET Pink RF (Ciba); PALIOGEN Red 3871K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red $H_8B$ (Reactive Red 31), available from Atlas Dye-Chem; D&C Red #28 (Acid Red 92), available from Wamer-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

The colored non-fluorescent materials may be present in a fluorescent ink from about 0.5% to about 75%, from about 0.75% to about 50%, or from about 1% to about 30% by weight of the fluorescent ink.

In certain embodiments, the fluorescent ink does not include any colored non-fluorescent material. Such fluorescent ink is invisible in ambient light, but emits different colors under excitation with different UV wavelengths.

In a dual fluorescent ink, the weight ratio of the first fluorescent material to the second fluorescent material can be from 10:1 to 1:10, from 2:1 to 1:2, or about 1:1.

In a multiple fluorescent ink, the weight ratio of any two of the fluorescent materials can be from 10:1 to 1:10, from 2:1 to 1:2, or about 1:1.

Any suitable ink vehicle can be employed in any of the phase change inks disclosed herein. Suitable vehicles can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

Examples of suitable ink vehicles include, for example, ethylene/propylene copolymers, such as those available from Petrolite and of the general formula

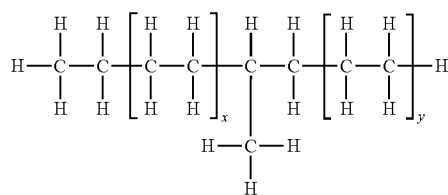

wherein y represents an integer from 0 to about 30, for example from 0 to about 20 or from 0 to about 10 and x is equal to about 21−y. The copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

Urethane derivatives of oxidized synthetic or petroleum waxes, such as those available from Petrolite and of the general formulas

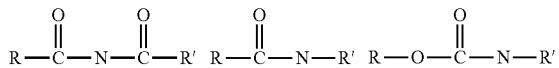

wherein R is an alkyl group of the formula CH3(CH2)n, n is an integer of from about 5 to about 400, for example from about 10 to about 300 or from about 20 to about 200 and R' is a tolyl group, may also be used as the ink vehicle. These materials may have a melting point of from about 60° C. to about 120° C., such as from about 70° C. to about 100° C. or from about 70° C. to about 90° C. Commercial examples of such materials include, for example, Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Another type of ink vehicle may be n-paraffinic, branched paraffinic, and/or naphthenic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Petrolite and of the general formula

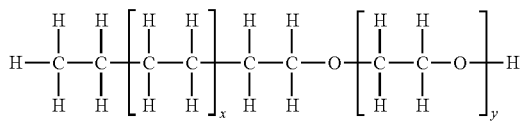

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-ethylenebisstearamide), and KEMAMIDE W20 (N,N'-ethylenebisoleamide).

High molecular weight linear alcohols, such as those available from Petrolite and of the general formula

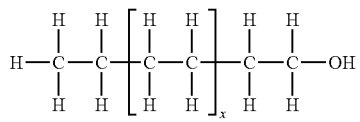

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

A still further example includes hydrocarbon-based waxes, such as the homopolymers of polyethylene available from Petrolite and of the general formula

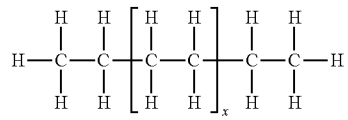

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include the line of waxes, such as POLYWAX 500 (Mn=500), POLYWAX 655 (Mn=655), POLYWAX 850 (Mn=850), POLYWAX 1000 (Mn=1,000), and the like.

Another example includes modified maleic anhydride hydrocarbon adducts of polyolefins prepared by graft copolymerization, such as those available from Petrolite and of the general formulas

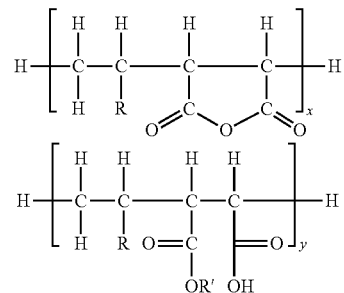

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from Petrolite and of the general formula

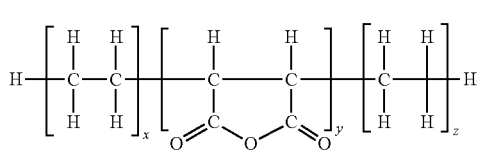

wherein R is an alkyl group with from about 1 to about 50, such as from about 5 to about 35 or from about 6 to about 28 carbon atoms, x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula

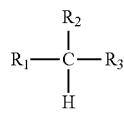

wherein $R_1$ and $R_3$ are hydrocarbon groups and $R_2$ is either of one of the general formulas

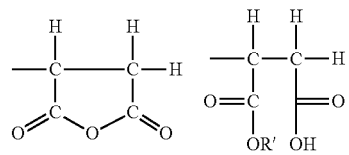

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=11), and the like.

Additional examples of suitable ink vehicles for the phase change inks include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, incorporated herein by reference, may also be used. Also suitable as ink vehicles are liquid crystalline materials as disclosed in, for example, U.S. Pat. No. 5,122,187, the disclosure of which is totally incorporated herein by reference.

The ink of the present embodiments may further include conventional additives to take advantage of the known functionality associated with such conventional additives. Such additives may include, for example, at least one isocyanate derived material, antioxidant, defoamer, slip and leveling agents, clarifier, viscosity modifier, adhesive, plasticizer and the like.

The ink vehicle or carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier in an amount of from about 2 to about 99 percent or from about 2 to about 90 percent or from about 3 to about 80 percent by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich ID14,400-2), (15) 2-amino-4-tert-amylphenol (Aldrich 41,258-9), (16) 2,6-bis (hydroxymethyl)-p-cresol (Aldrich 22,752-8), (17) 2,2'-methylenediphenol (Aldrich B4,680-8), (18) 5-(diethylamino)-2-nitrophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Adrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5- bis(trifluoromethyl)benzoic acid (Aldrich 32,527-9), (30) ethyl-2-(4-(4-(trifluoromethyl)phenoxy)phenoxy)propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional viscosity modifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Viscosity modifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about 5 percent by weight of the ink.

The ink vehicle may be present in an amount from about 50% to about 99.5% by weight, for example from about 60% to about 99%, or from about 65% to about 98% by weight of the fluorescent ink.

The fluorescent inks may be used in printing of color changing text, pictures, or codes for encryption. Examples of suitable encryption include 2D barcodes, which are made secured by using dual fluorescent inks.

In embodiments, the ink carriers for fluorescent inks (e.g., phase change ink) may have melting points of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C. Furthermore, low energy inks have a jetting viscosity of about 9 cP to about 13 cP, such as from about 10 cP to about 11 cP, from about 10.25 cP to about 10.75 cP or from about 10.45 cP to about 10.85 cP, at melting points of about 107° C. to about 111° C.

Typically, the fluorescent ink has a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C. The fluorescent ink can be a solid at a temperature below about 40° C.

Any combination of emitted colors is possible. The dual color emitting property makes the color changing phase change ink disclosed in the present disclosure more difficult to counterfeit when compared with standard fluorescent security inks. While dual emission was demonstrated, the concept can be extended to multi color emission.

The present disclosure may be implemented by careful selection of fluorescent dyes with appropriate excitation/emitting properties at essentially little or no extra manufacturing cost. The disclosed fluorescent security inks can be used for authentication as well as for encryption purposes.

Methods of using the fluorescent inks of the present disclosure for authentication can generally comprise the steps of: 1) providing a substrate; 2) contacting the substrate with a fluorescent ink comprising more than one fluorescent materials that emits different colors of light upon exposure to different excitation wavelengths; and 3) detecting emissions under different excitation wavelengths.

In embodiments, the methods of authentication wherein the fluorescent ink comprises two or more fluorescent materials, and wherein the fluorescent ink composition emits light of a first color upon exposure to a first excitation wavelength, emits a light of a second color upon exposure to a second excitation wavelength, and so forth.

In embodiments, the methods of authentication wherein the fluorescent ink comprises a first fluorescent material and a second fluorescent material, and wherein the fluorescent ink composition emits light of a first color upon exposure to a first excitation wavelength and emits a light of a second color upon exposure to a second excitation wavelength.

In further embodiments, the methods of authentication wherein the wherein the difference between the absorption maxima of the first fluorescent material and the absorption maxima of the second fluorescent material is at least 30 nm, at least about 50 nm, or at least about 100 nm; wherein the fluorescent ink composition emits light of a first color upon exposure to a first excitation wavelength and emits a light of a second color upon exposure to a second excitation wavelength; wherein the difference between the first excitation wavelength and the second excitation wavelength is at least 30 nm In embodiments, the methods of authentication wherein the fluorescent ink is a multiple fluorescent multiple color ink, which comprises more than two fluorescent materials, wherein the difference between the absorption maxima of any of the more than one fluorescent materials is at least 30 nm, and wherein the difference between the first excitation wavelength of any of the more than one fluorescent materials is at least 30 nm.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

A large set of fluorescent dyes combinations were screened and tested. Only very few met the requirements described herein and suitable for use as dual color fluorescent ink. We found that simply mixing fluorescent dyes which emit different color does not provide a dual color emitting ink. Instead, such mixed fluorescent dyes in an ink emitted the same color at different wavelength or was not sufficiently to be detected by human eye (as required for authentication).

Combinations of fluorescent dyes enabling dual color are relatively rare when compared to combinations which do not change color (i.e., as previously known in prior art). This is beneficial because it makes it even harder for counterfeiter to duplicate a secure document protected with dual fluorescent color capability.

Example 1

Preparation of Fluorescent Ink (a) One Color Fluorescent Inks

Fluorescent inks containing only one fluorescent material were prepared by melt mixing 10 g of a yellow ink (yellow commercial Xerox ink available with ColorQube printer ink) with fluorescent dye additives:
Fluorescent 1: 2-(2-hydroxybenzoxazol) (a green emitting dye commercially available from Sigma-Aldrich); (Ink 1)
Fluorescent 2: DFKY-C7 (a red emitting dye commercially available Risk Reactor Company); (Ink 2) The quantities are displayed in Table 1.

(b) Preparation of Dual Color Fluorescent Inks

The fluorescent dye additives and the quantities used in the Ink 3 are displayed in Table 1 below.

TABLE 1

| | | | Emitted color | | |
|---|---|---|---|---|---|
| Ink # | Fluorescent | Amount | @ 254 nm | @ 365 nm | Comments |
| Ink 1 | Fluorescent 1 | 100 mg | Green | Green | Same emitted color @ 254 nm and 365 nm." |
| Ink 2 | Fluorescent 2 | 100 mg | Red | Red | Same emitted color @ 254 nm and 365 nm." |
| Ink 3 | Fluorescent 1 Fluorescent 2 | 200 mg 30 mg | Green | Red | 2 different emitted colors as the detection wavelength changes |

Example 2

Ink Detection

Figure 2:
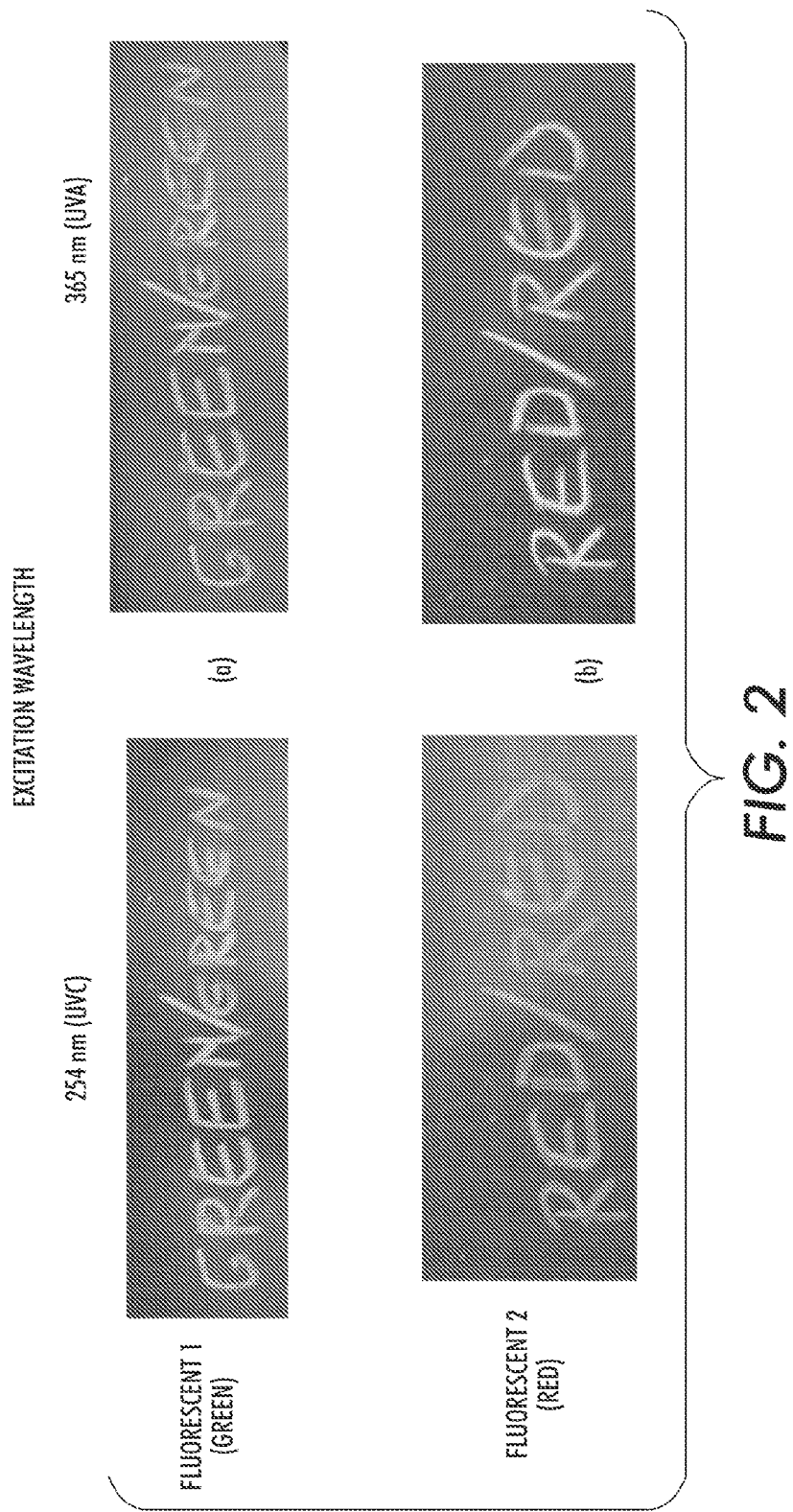
FIG. 2 illustrates the emission of the same color at 254 nm (UVC) and 365 nm (UVA) excitation wavelengths of Control Inks made with one fluorescent material: top: Fluorescent 1; bottom: Fluorescent 2.

Inks 1 and 2 represent the standard fluorescent phase change ink compositions disclosed herein. FIGS. 2a and 2b illustrates the emission at 254 nm (UVC) and 365 nm (UVA) excitation wavelengths of Inks 1 and 2 made with one fluorescent material. Ink 1 demonstrated a strong emission intensity at 254 nm and a relatively lower intensity emission at 365 nm. Ink 1 emitted green color under both wavelengths at 254 nm and 365 nm with no color change. Ink 2 demonstrated a low emission intensity at 254 nm and a stronger signal at 365 nm. The intensity of red color emitted at 365 nm (FIG. 1b—right) was much stronger than that at 254 nm (FIG. 1b—left). Ink 2 emitted red color at both wavelengths with no color change.

Figure 3:
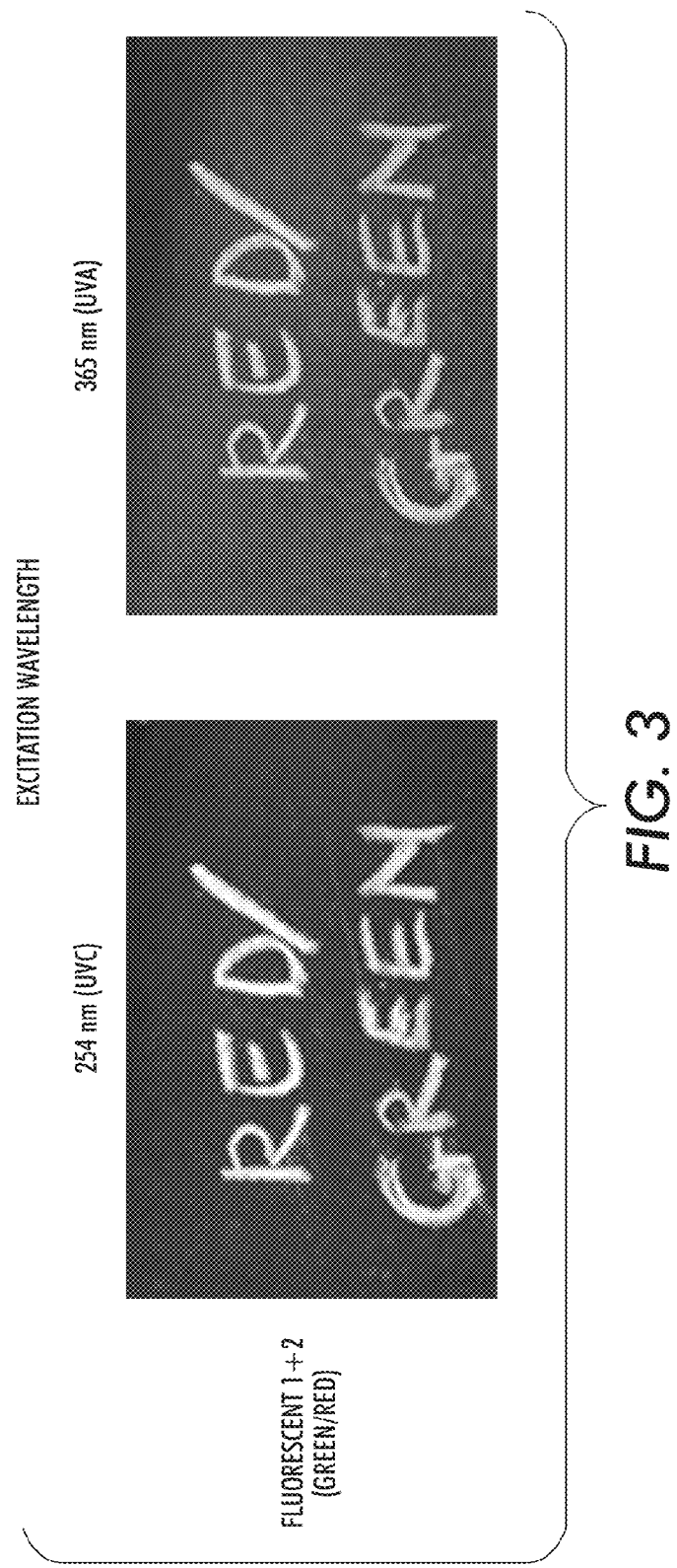
FIG. 3 illustrates the emission of different colors at 254 nm (UVC) and 365 nm (UVA) excitation wavelengths respectively, of Inks made with two fluorescent materials according to an embodiment of the disclosure.

FIG. 3 illustrates the emission at 254 nm (UVC) and 365 nm (UVA) excitation wavelengths of Ink 3 made with two fluorescent materials. For each fluorescent dye additive, the low intensity emitted color at the given exciting UV light was essentially "invisible" due to the strong intensity emission of the other color. Only the strong intensity emitted color was detectable by eye. Therefore, dual emitted color was observed. Ink 3 emitted different colors as a function of the excitation wavelengths. Ink 3 emitted green light when detected with UVC (e.g., at 254 nm) and red light when detected with UVA (e.g., at 365 nm).

Example 3

Preparation of Counter Example Fluorescent Inks

Below are illustrated a few of the many combinations which did not emit dual colors when authenticated with UVC and UVA. The individual dyes emitted different colors, but the combined dyes emitted the same color when authenticated with both UVA and UVC. Inks 4, 5 and 6 were prepared by adding fluorescent materials to phase change ink base. The phase change ink base components are listed in Table 2.

TABLE 2

Ink base components

| Ink Base Component | Details |
|---|---|
| Polymethylene wax | A fractionated polymethylene wax available from IGI Inc. |
| Triamide wax | As prepared in Example 1 of U.S. Pat. No. 6,860,930 |
| Kemamide S-180 ® | Stearyl stearamide available from Witco Chemical Corporation |
| KE-100 ® | an ester of tetrahydroabietic acid and glycerol available from Arakawa Industries |
| Urethane resin | As prepared in example 4 of U.S. Pat. No. 6,309,453 |
| Naugard ® 445 | Antioxidant available from Uniroyal Chemical Company |

Figure 4:
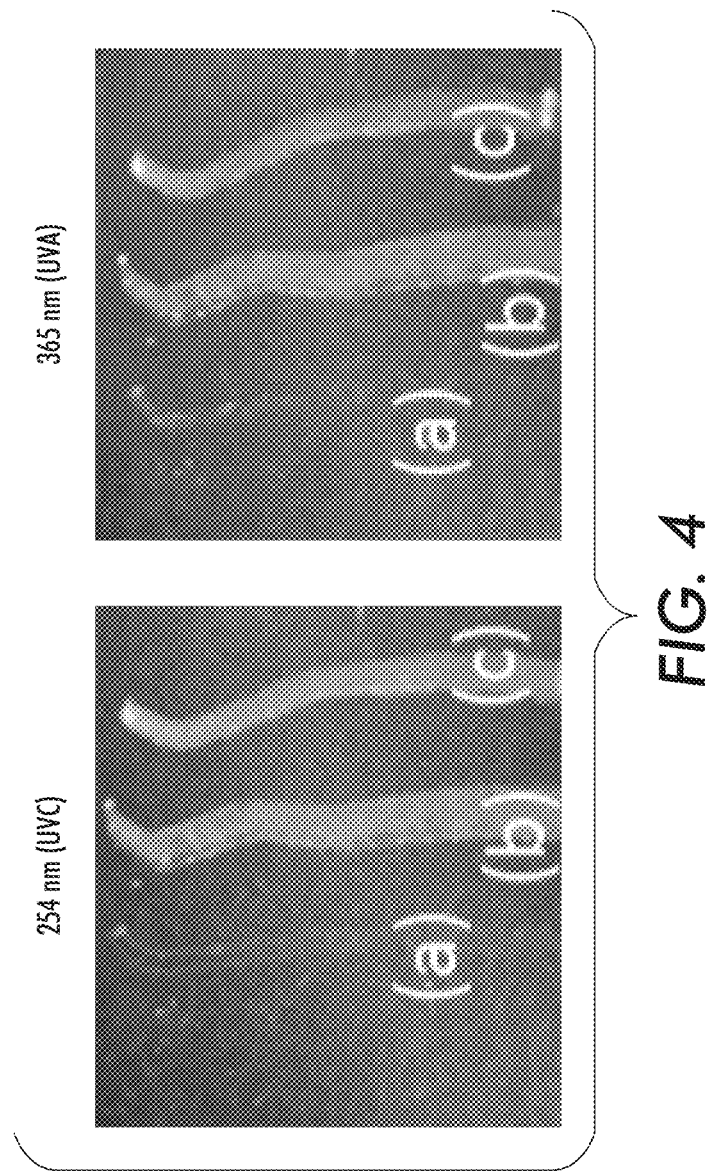
FIG. 4 illustrates the emission of the same color at 254 nm (UVC) and 365 nm (UVA) excitation wavelengths of a Control Ink made with two unsuitable fluorescent materials (counterexample 1)
Figure 5:
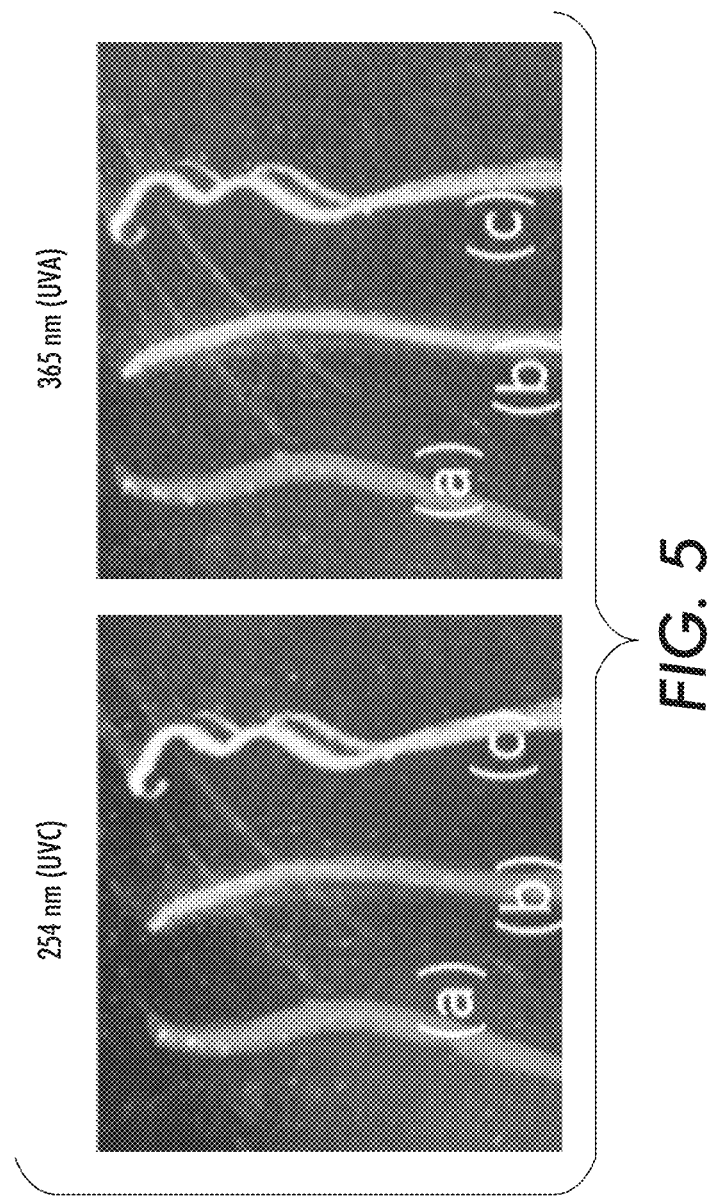
FIG. 5 illustrates the emission of the same color at 254 nm (UVC) and 365 nm (UVA) excitation wavelengths of yet another Control Ink made with two unsuitable fluorescent materials (counterexample 2).

Three lines were drawn from these inks in the following order: (a) fluorescent 3, (b) fluorescent 4 and (c) mixture of fluorescent 3 and 4. FIGS. 4 and 5 illustrates the observed emitted color of Ink 4 and 5 respectively under the emission at 254 nm (UVC) and 365 nm (UVA) excitation wavelengths.

Preparation of Ink 4

Fluorescent 3: 2,5-diphenyl-oxazole (150 mg), and Fluorescent 4: 2(2-hydroxyphenylbenzothiazol) (150 mg) were mixed well with 10 g of commercially available Xerox yellow ink used with colorCube printer 2,5-diphenyl-oxazole emitted blue color and 2(2-hydroxyphenylbenzothiazol) emitted green color at both UVA and UVC. Although 2,5-diphenyl-oxazole has a stronger emission at UVC when compared to UVA, the overall emission was too low when compared with the strong emission of 2(2-hydroxyphenylbenzothiazol). Therefore, the ink containing the mixture of these two dyes shows green at both UVA and UVC.

Preparation of Ink 5

Fluorescent 3: DFKY-C7 (100 mg), and Fluorescent 4: 2-(2-hydroxyphenylbenzothiazole) (100 mg) were mixed well.

DFKY-C7 alone emitted red color and 2-(2-hydroxyphenylbenzothoazole) alone emitted green color at both UVA and UVC. The difference between UVC and UVA of the ink containing both fluorescents was essentially insignificant. This is because both fluorescents had strong emissions at UVA and at UVC. The observed color was the sum of the two emitted colors in both cases.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A fluorescent ink comprising more than one fluorescent materials capable of emitting different colors of light upon exposure to different excitation wavelengths, wherein the difference between the absorption maxima of any two of the more than one fluorescent materials is at least 30 nm.

2. The fluorescent ink according to claim 1, wherein the ink is a phase change ink.

3. The fluorescent ink according to claim 1, wherein the more than one fluorescent materials comprises a first fluorescent material and a second fluorescent material, and wherein the fluorescent ink emits a light of a first color upon exposure to a first excitation wavelength and emits a light of a second color upon exposure to a second excitation wavelength.

4. The fluorescent ink according to claim 3, wherein the weight ratio of the first fluorescent material to the second fluorescent material is from 10:1 to 1:10.

5. The fluorescent ink according to claim 3, wherein one of the more than one fluorescent materials has an excitation wavelength of from 280 nm to 360 nm.

6. The fluorescent ink according to claim 1, wherein the more than one fluorescent materials further comprises a third fluorescent material.

7. The fluorescent ink according to claim 1, wherein a total amount of the more than one fluorescent materials comprises from about 0.01% to about 15% by weight of the fluorescent ink.

8. The fluorescent ink according to claim 1, wherein the more than one fluorescent materials is independently selected from the group consisting of rhodamines, fluoresceins, coumarins, napthalimide, benzoxanthenes acridines, azos, rare earth metal coordination complexes and mixtures thereof.

9. The fluorescent ink according to claim 1, wherein one of the more than one fluorescent materials has an excitation wavelength of from 180 nm to 300 nm.

10. The fluorescent ink according to claim 1, wherein one of the more than one fluorescent materials has an excitation wavelength of from 320 nm to 400 nm.

11. The fluorescent ink according to claim 1, wherein the fluorescent ink further comprising a colored non-fluorescent colorant selected from the group consisting of cyan, magenta, yellow, black and mixtures thereof.

12. The fluorescent ink according to claim 1, wherein the fluorescent ink contains no colored non-fluorescent material.

13. The fluorescent ink according to claim 1 wherein the fluorescent ink further comprises an ink vehicle selected from the group consisting of ethylene/propylene copolymers, urethane derivates of oxidized synthetic or petroleum waxes, n-paraffinic hydrocarbons, branched paraffinic hydrocarbons, naphthenic hydrocarbons, highly branched hydrocarbons linear alcohols, hydrocarbon-based waxes, modified maleic anhydride hydrocarbon adducts of polyolefins prepared by graft copolymerization, fatty amides, rosin esters polyamides, dimer acid amides, fatty acid amides, polyvinyl alcohol resins, polyols, cellulose esters, cellulose ethers, polyvinyl pyridine resins, fatty acids, fatty acid esters, poly sulfonamides, phthalate plasticizers, citrate plasticizers, maleate plasticizers, sulfones, and mixtures of linear primary alcohols with linear long chain amides or fatty acid amides, and mixtures thereof.

14. The fluorescent ink according to claim 13, wherein the ink vehicle is a solid at a temperature below about 40° C. and has a viscosity of from about 1 to about 20 centipoise at a jetting temperature of from about 60° C. to about 150° C.

15. A fluorescent ink comprising:
a first fluorescent material and a second fluorescent material, wherein the weight ratio of the first fluorescent material to the second fluorescent material is from 10:1 to 1:10, wherein the difference between the absorption maxima of the first fluorescent material and the absorption maxima of the second fluorescent material is at least 30 nm, wherein the fluorescent ink emits light of a first color upon exposure to a first excitation wavelength and emits a light of a second color upon exposure to a second excitation wavelength;

wherein the difference between the first excitation wavelength and the second excitation wavelength is at least 30 nm.

16. The fluorescent ink according to claim 15, wherein the fluorescent ink further comprises a third fluorescent material, wherein the fluorescent ink further emits light of a third color upon exposure to a third excitation wavelength, wherein the difference between the first excitation wavelength and the third excitation wavelength is at least 30 nm and the difference between the first excitation wavelength and the third excitation wavelength is at least 30 nm.

17. A method of authentication comprising:
providing a substrate;
contacting the substrate with a fluorescent ink comprising more than one fluorescent materials that emits different colors of light upon exposure to different excitation wavelengths, wherein the difference between the absorption maxima of any two of the more than one fluorescent materials is at least 30 nm; and
detecting emissions under different excitation wavelengths.

18. The method of claim 17, wherein the more than one fluorescent materials comprises a first fluorescent material and a second fluorescent material, and wherein the fluorescent ink emits a light of a first color upon exposure to a first excitation wavelength and emits a light of a second color upon exposure to a second excitation wavelength, wherein the difference between the absorption maxima of the first fluorescent material and the absorption maxima of the second fluorescent material is at least 30 nm, and wherein the difference between the first excitation wavelength and the second excitation wavelength is at least 30 nm.

19. The method of authentication according to claim 17, wherein the fluorescent ink further comprises a third fluorescent material, wherein the fluorescent ink further emits light of a third color upon exposure to a third excitation wavelength, wherein the difference between the absorption maxima of any of the more than one fluorescent materials is at least 30 nm, and wherein the difference between the first excitation wavelength of any of the more than one fluorescent materials is at least 30 nm.

* * * * *